Nov. 26, 1935.  C. EISENLOHR ET AL  2,022,371

MACHINE FOR MAKING PAPER BOX BLANKS

Filed Oct. 19, 1934  6 Sheets-Sheet 2

INVENTORS,
Joseph Herrn, deceased,
By Barbara Herrn, Executrix,
BY Carl Eisenlohr.

A. R. Appleman
ATTORNEY

Nov. 26, 1935.   C. EISENLOHR ET AL   2,022,371
MACHINE FOR MAKING PAPER BOX BLANKS
Filed Oct. 19, 1934   6 Sheets-Sheet 3

INVENTORS,
Joseph Herr, deceased,
Barbara Herr, Executrix,
BY   Carl Eisenlohr.
A. R. Appleman
ATTORNEY.

Nov. 26, 1935.  C. EISENLOHR ET AL  2,022,371
MACHINE FOR MAKING PAPER BOX BLANKS
Filed Oct. 19, 1934  6 Sheets-Sheet 4

Fig. 4.

Inventors,
Joseph Hern, deceased,
By Barbara Hern, Executrix.
Carl Eisenlohr.
A. R. Appleman
by Attorney.

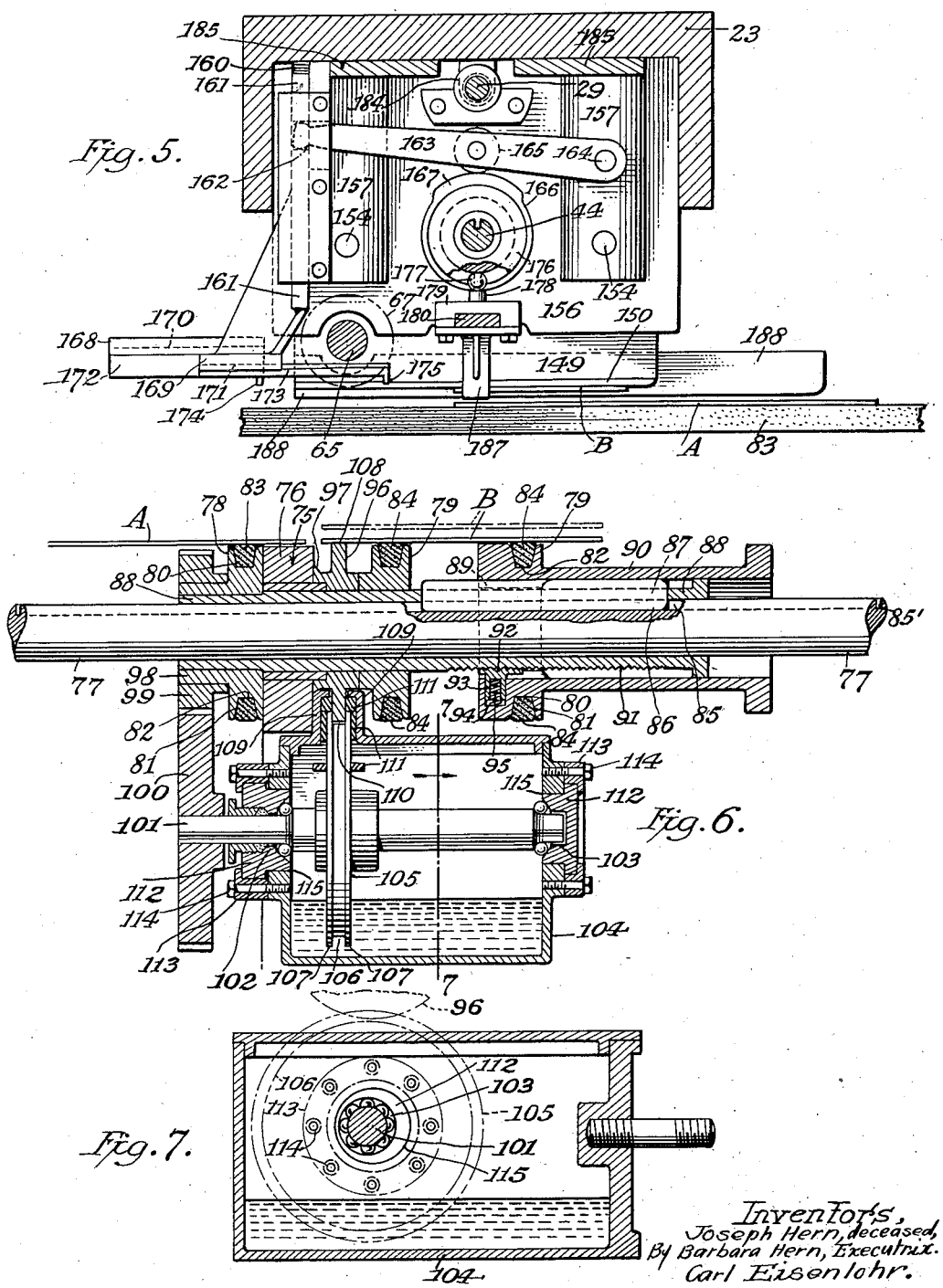

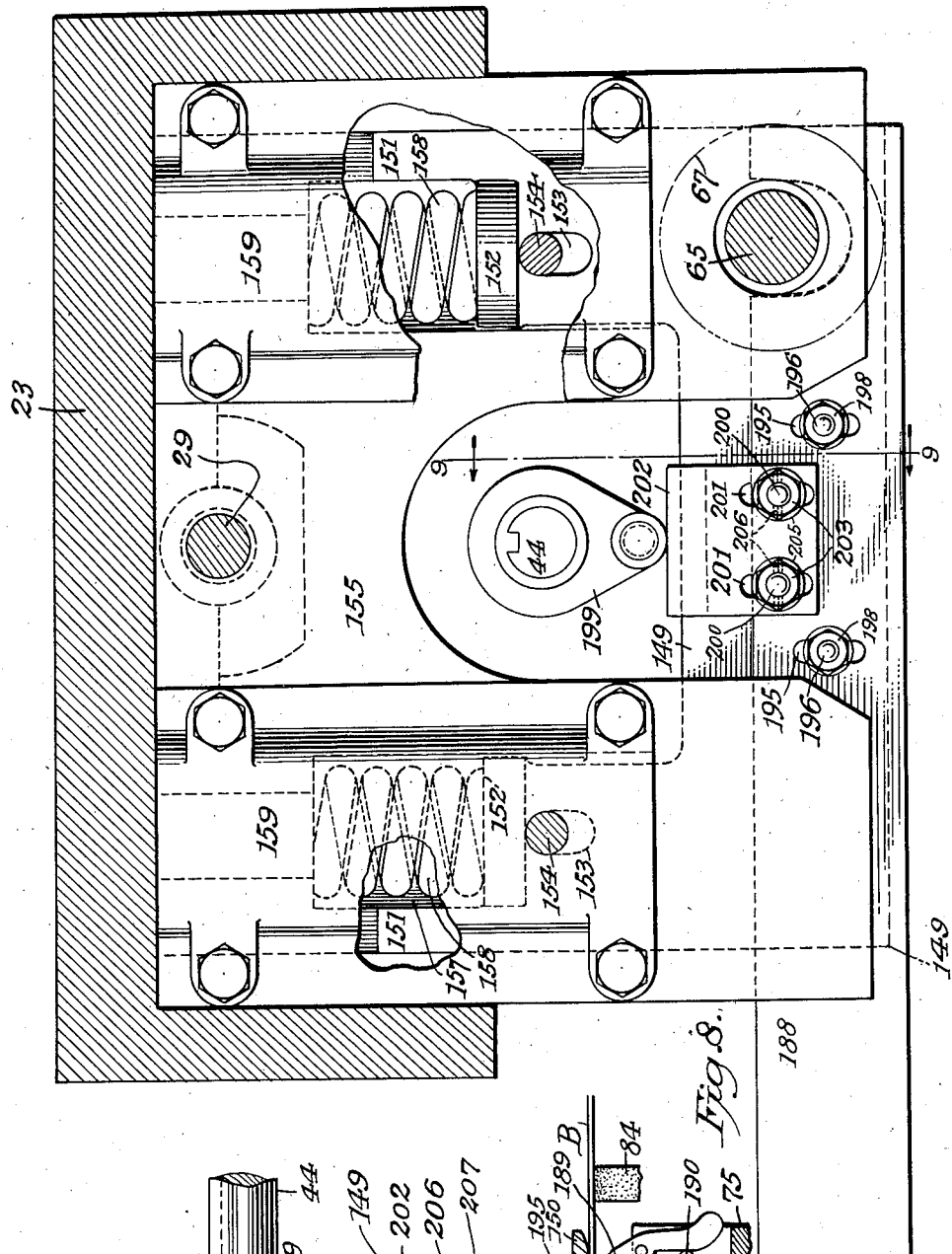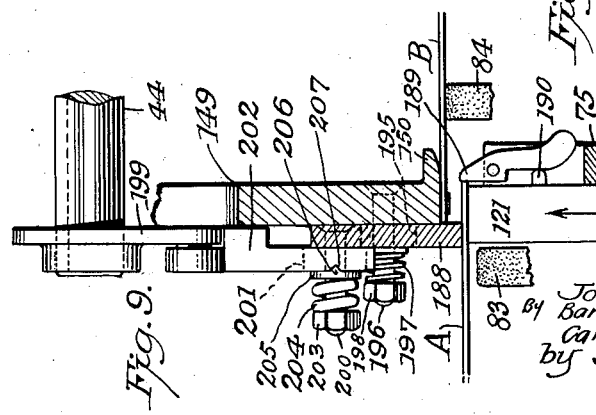

Patented Nov. 26, 1935

2,022,371

UNITED STATES PATENT OFFICE 2,022,371

MACHINE FOR MAKING PAPER BOX BLANKS

Carl Eisenlohr, Newark, N. J., and Joseph Hren, deceased, late of Kingston, N. Y., by Barbara Hren, executrix, Newark, N. J.

Application October 19, 1934, Serial No. 749,050

15 Claims. (Cl. 93—55)

The principal object of our present invention resides in the provision of improvements in the construction of a machine for making paper box blanks, disclosed in a patent issued to us November 3, 1925, No. 1,560,162.

A further object being to provide heavy cross bracing means for a frame and to confine the mechanism, which in the operation of the machine, is subjected to heavy strains and stresses, including an improved individual springing construction, between or within the heavy cross bracing means and the interlocked sides of the frame in the upper portion thereof.

A further object is to provide adjustable conveying belts or tapes in connection with novel adjustable glue applying mechanisms.

Further objects include automatically controlled gravity stops for registering the box blanks just prior to a sealing operation, and safety means for preventing breakage of parts in the sealing operations, if the timing should be disturbed or for other reasons.

A further object has been effectively accomplished by inverting the important mechanisms of the above identified patent to eliminate glue drippings, and deposits forming on the active parts, making it necessary to suspend production, for cleaning the parts at frequent intervals.

A further important feature is to dispose individual springing mechanisms at opposite sides of the machine at the sealing station and in direct line with the pressure or sealing thrust, to insure perfect sealed joints between the side and center of the box blanks as this construction compensates for all inequalities of box blank material and the quality of the glue employed; and further the alignment mentioned prevents side or lateral strains or stresses.

In order that the invention may be clearly understood, and readily carried into effect, the same will now be described more in detail with reference to the accompanying drawings illustrating a preferred embodiment thereof and in which:

Fig. 4 is a top or plan view of box blank feeding and conveying mechanism with parts of the machine omitted.

Fig. 5 is an enlarged sectional elevation taken about on the dotted line 5—5 of Fig. 3, showing the automatically controlled stops carried on a cam controlled drop-bar on the outside of a spring casing.

Fig. 6 is an enlarged section taken along a pulley shaft and about on the dotted line 6—6 of Fig. 4.

Fig. 7 is a vertical sectional elevation through a glue box at about on the dotted line 7—7 of Fig. 6, showing an eccentrically mounted bearing whereby a revoluble shaft may be adjusted laterally.

Fig. 8 is an enlarged view of the spring casing shown in Fig. 5, but looking from near the center of the machine as indicated by the dotted line 8—8 of Fig. 3, parts being broken away to disclose the springs and their supports, the stops being omitted.

Fig. 9 is a fragmentary vertical section on the line 9—9 of Fig. 8, a portion of a presser and its guide casing added.

Fig. 14 is a top or plan view of a composite paper box blank formed by the machine of our invention, showing the inner edges of the side pieces overlapping the side edges of the center piece.

Figure 1:
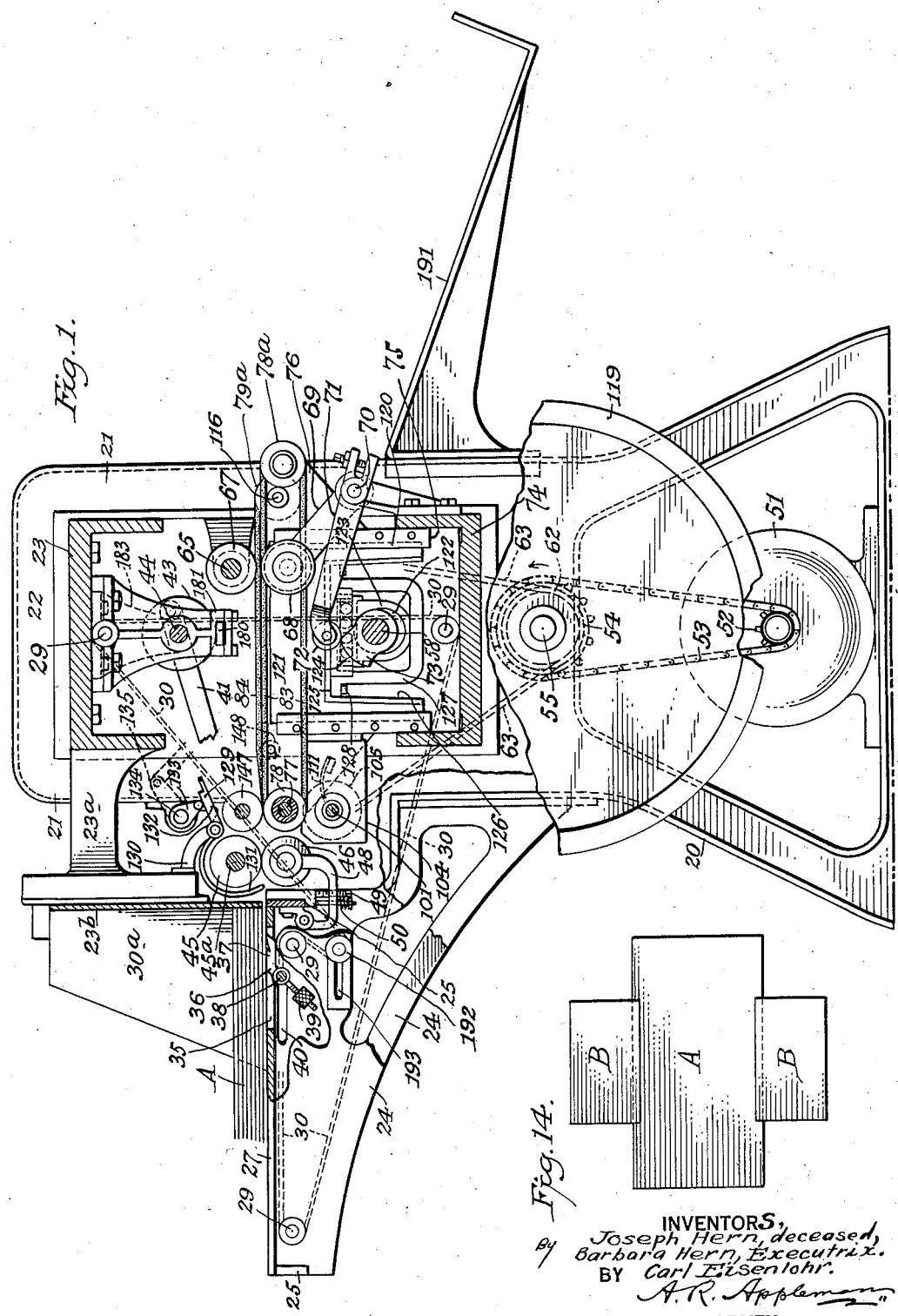
Fig. 1 is a view of the right side of the box blank making machine, with parts broken away, parts in section and parts omitted, and showing the locations of the driven shafts of the machine.

The machine may be described in detail as follows: 20 indicates the main side frames, the bottom parts of which are extended to form substantial floor engaging surfaces and the upper portions of which extend upwardly to form parallel side portions 21, and a connecting top portion 22, preferably integral with the side portions for strength and stability.

Bolted or otherwise rigidly secured to the underside of the connecting top portions of the main frames, is a heavy channel or box beam 23, for effectively tying the upper portions of the frames together against strains and stresses in the operation of the machine parts, and further for supporting parts of the oppositely arranged anvil mechanisms.

Projecting from the box beam 23 is an arm 23a to which are secured the plates 23b (Fig. 1) which form the real walls of the blank sheet magazines.

Suitably secured to the front of the upper frame portions 21 are a pair of brackets 24.

A pair of cross supporting bars 25 are secured to the brackets at the front and rear thereof and support a plurality of rails 26 to form a supporting surface for the main or central sheets A of the sets of box blanks forming parts of a box blank structure when assembled by this machine.

Slidably mounted on the bars 25 are a pair of plates 27, having nuts 28, secured to the under faces for engaging two of a number of adjusting screws 29 of the machine, all being connected for simultaneous adjustment by a hand operated chain 30.

Extending upwardly from and secured to each of the plates 27, a short distance outwardly from its inner edge, is a dividing plate 30a which defines the sides of the central sheet magazine, the central sheets A resting on the inner edges of the plates 27 and the sheet supporting rails 26.

Adjustably mounted on each plate 27 as by means of the brackets 31, having slots 32 therein are side plates 33, which constitute the outer walls of side magazines for wing or side blanks B of the box blank to be formed, a wing nut 34 or other device being provided to secure the side plates in adjusted positions. Each plate is formed with a slot or opening 35 for permitting free operation of sheet feeding devices 36, here shown as toothed blocks 37 swingable on a drag rod 38 and each having a weight 39 for holding the teeth of the blocks in contact with the respective bottom sheets of the blank stacks in the magazines during the feeding stroke or operation of said blanks to suitable feed rolls hereinafter described.

The drag rod 38 passes through slots 40 in the brackets 24, and its extended ends have pivotal connections with links 41, which in turn are connected at their opposite ends with wrist pins 42 carried by crank disks 43 on a constantly driven cam shaft 44 properly timed with other mechanisms of the machine, to be later described. It will be obvious that through the links 41, at each revolution of the cam shaft a set of box blanks are fed from the magazines into engagement with and between vertically aligned feed rollers 45 and 46 respectively; the upper roller 45, having an extended shaft 45a which is journalled in bearings 47 fixed to the sides 21 of the frame 20, while the lower roller or rollers 46 have adjusted contact with the upper roller through yielding mountings as at 48 made adjustable by set screws 49 and springs 50, as shown best in Fig. 1 of the drawings.

Figure 2:
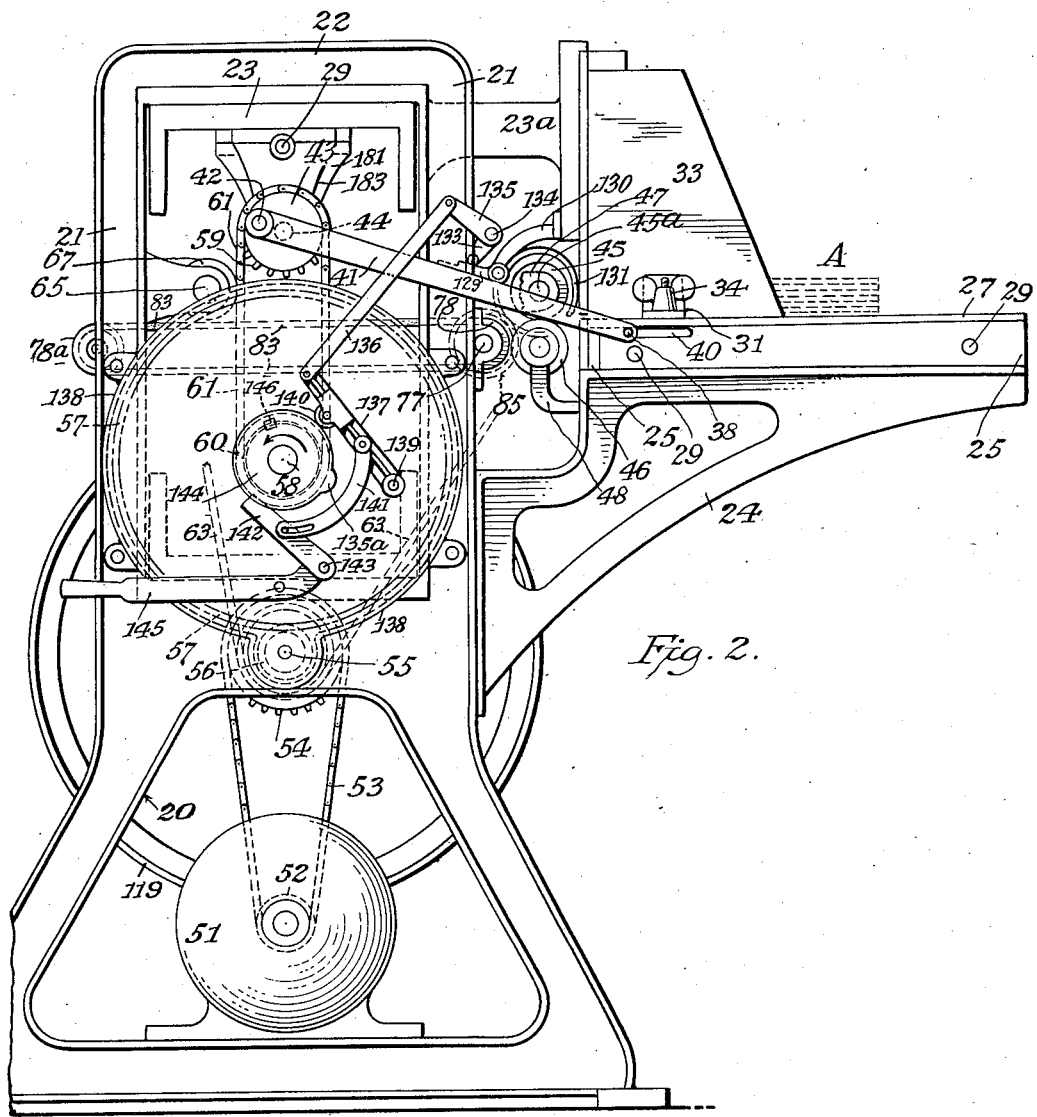
Fig. 2 is a view of the left side of the machine showing a clutch control means and with parts omitted.
Figure 12:
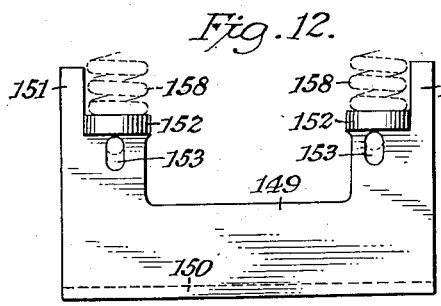
Fig. 12 is a detail side view of an anvil plate having integral spring rests disposed centrally of said plate so that sealing thrusts are received centrally of heavy springs to eliminate side or lateral strains or stresses.
Figure 13:
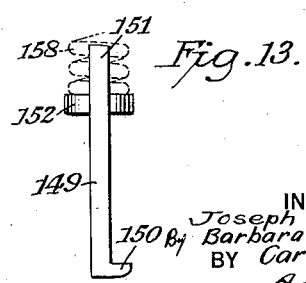
Fig. 13 is an end view of the anvil plate.
Figure 3:
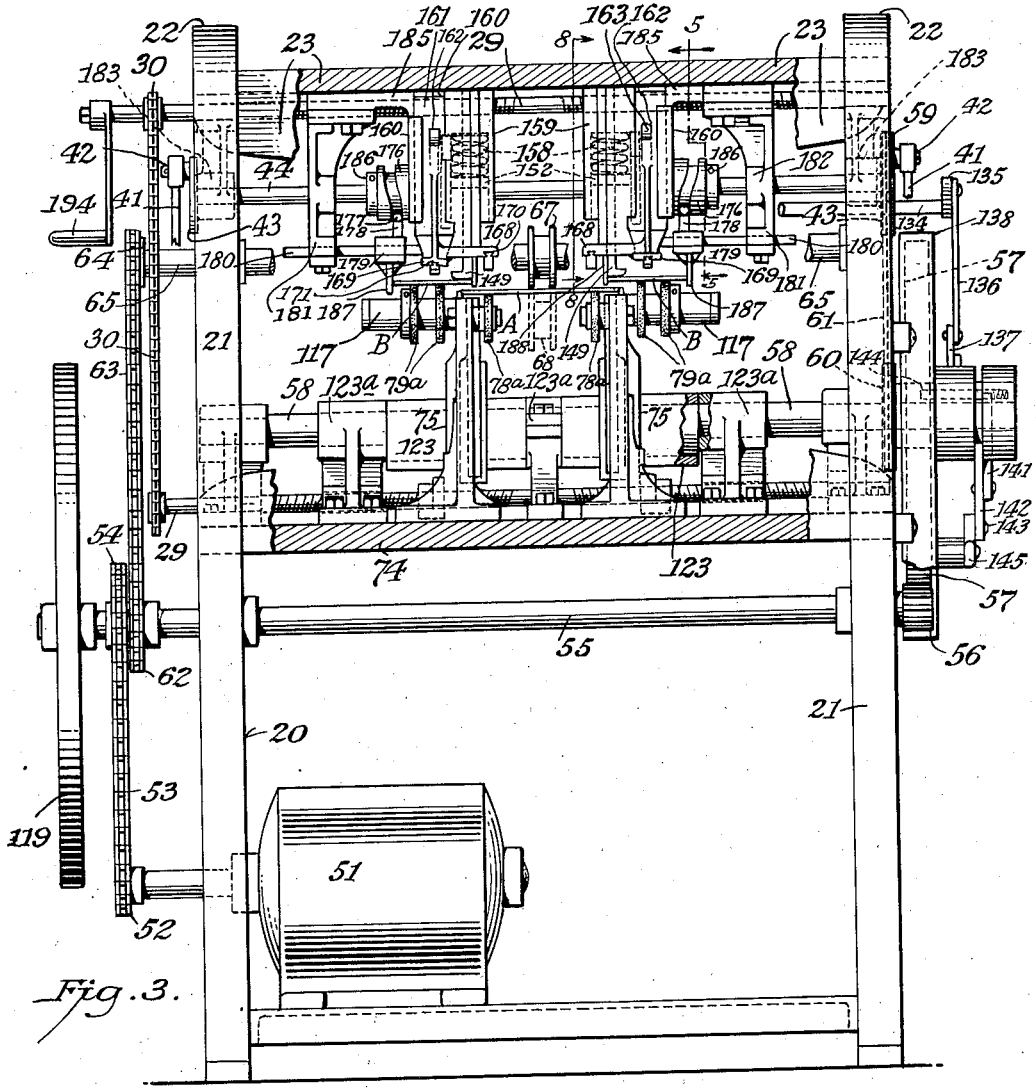
Fig. 3 is a rear elevation of the machine with parts broken away and parts omitted, showing a set of paper box blanks in position ready for the sealing operation.

The driving mechanism consists of a motor 51, or other source of power, having a sprocket 52 connected through a chain or belt 53 to a suitably proportioned gear 54, fast on the cross shaft 55, which shaft at its opposite end, carries a pinion 56, meshed with a large gear 57, loose on an end of a presser shaft 58. The cam shaft 44 and the presser shaft 58 are driven in synchronous timed relation by a sprocket gear 59 formed on one of the crank disks 43 and a sprocket gear 60 on the presser shaft 58 through a chain connection 61, as shown in Figs. 2 and 3 of the drawings.

The driving mechanism is continued through a sprocket 62 (Fig. 3) on the cross shaft 55 over which a chain or belt 63, is carried to a sprocket 64 on an ejector shaft 65, and thence over a sprocket 66 (Fig. 4) on the feed roller shaft 45a, thus providing a three point drive.

Secured to the ejector shaft 65, centrally of the machine, is an ejector roller 67 which has a central fixed position on its rotary shaft, its rotating edge being above and clear of the central piece of the composite box blank when at the sealing station and coacting with the ejector roller for ejecting a finished box blank from the machine is a companion roller 68 (Fig. 1) carried at the free end of an arm 69, fast on a rock shaft 70, with another arm 71, having a roller 72, adapted to contact a cam 73 on the presser shaft 58, for raising said roller 68 at timed intervals, to engage the underside of progressive central box blanks at a point opposite the upper roller 67, to effect an opposed squeeze against said blanks.

An important feature of the present invention is found in novel conveying means for the box blanks from the feed rollers to the sealing station, said means presenting an adjustable structure for varying widths of center and side blanks which will now be described with reference to Figs. 1, 4 and 6 of the drawings.

Bolted or otherwise rigidly secured to the side frames 21, about midway the height of the frame 20, is a lower box beam 74, on which a pair of presser housings 75, may be adjustably spaced by the screw shaft 29; these housings have end extensions 76 (Fig. 4) and passing through the extensions at the front ends of the housings is a pulley shaft 77 for supporting a number of pulleys, which may best be described in pairs, i. e., a pair of center pulleys 78 operating along the inner faces of the presser housings 75, and opposite pairs of side pulleys 79 operating outward of the presser housings; at the opposite or rear ends of the presser housings 75 are mounted for rotation, a corresponding pair of center pulleys 78a, and corresponding pairs of side pulleys 79a, seen best in Figs. 4 and 1.

The pulleys just described all have circumferential grooves 80, preferably having inwardly flaring walls 81 and a flat bottom 82, (Figs. 6 and 10), in which conveying belts or tapes having a similar cross-sectional contour are received; the belts are preferably flexible but not elastic and are maintained taut or tight between their respective pulleys and are preferably but not necessarily of a rubberized material to create a conveying or tractive contact with the box blanks resting thereon.

It will, of course, be understood that the pair of center belts 83, act to convey the center box blanks A to the presser station while the side belts 84, act to convey the side blanks B to said station. The cross section shape of the pulley grooves and belts produces an interlocking, gripping or wedging action, so that there is no slippage or creeping of the belts on the pulleys in operation.

Means for quickly adjusting the spacing of the side belts 84 to accommodate different widths in side blanks, may be accomplished by the construction shown best in Figs. 4 and 6, which may be described as follows:

The pulley shaft 77 is preferably driven from the shaft 45a of the feed roller 45, through an appropriate connection such as a belt or chain or by gears located either within the side frames 21, or outside the same as shown at 85 in Fig. 4.

The pulley shaft 77 is formed with a longitudinal groove or keyway 85, in which elongated keys 86 (only one shown) rest, these keys are wide enough to pass through slots 87 in inner tubes or sleeves 88 and into grooves 89, formed in a portion of outer sleeves, tubes or handle pieces 90, for interlocking the parts 77, 88 and 90 for simultaneous rotation.

Each of the inner sleeves 88 has a row of V shape ratchet teeth 91 cut therein, which are engaged by toothed ratchets 92 having tubular shanks 93 having radial movements in sockets or bores 94 formed in the outer sleeve, Fig 6. Charged springs 95 housed within the tubular shanks 93 of the ratchets, serve to exert a yielding thrust of the tooth ratchets 92 into setting contact with the ratchet teeth 91 of the sleeves 88 which operate to yieldingly lock the outer of each pair of side pulleys 79 in an adjusted spaced position relative to the position of the inner of said side pulleys 79, to compensate for various widths of side blanks B of the box blank structure. For convenience in making this adjustment, the outer sleeves 90 serve as handles which may be gripped by the hand to draw the ratchets against the resistance set up by the spring urged ratchets, longitudinally along the pulley shaft 77 to a determined position for conveying the side blanks B of a known width or dimension.

The inner pulley 79 of each pair of outer pulleys is fast with its respective inner sleeve 88, as are also glue applying rollers 96, having beveled fender hubs 97 bearing against the presser housing extensions 76, to exclude excess glue from the abutting faces of the hub and bearing, as clearly shown in Fig. 6. The center pulleys 78, fixed to the inner sleeve 88, inwardly of the bearing extensions 76 of the presser housing, are formed with tubular hubs 98, to which gears 99 are fast, which gears are in constant mesh with driven gears 100 fixed to shafts 101 extending through bearings 102 and into bearings 103 in the opposite side walls of the glue boxes 104, Figs. 6 and 7.

Fixed on the revoluble shafts 101 are glue feeding rollers or disks 105, having formed in their peripheries circumferential grooves 106, of a rectangular cross section, whose side walls 107 move in near contact with the peripheral sides of the glue applying rollers 96, which are formed with a smooth flat circumferential face 108 for applying a uniform sharply defined line of glue to the under surface of the passing side box blanks B and near the inner edges thereof.

The glue boxes 104 have hoods or extensions 109 through which the lower portions of the glue applying rollers sweep in their rotary movement, leaving a narrow space as at 110 between them and the bottoms of the grooves 106, thus picking up at that point films of glue corresponding to said space.

Wipers or brushes 111 are preferably arranged within the hoods and at the sides of the feed rolls 105 to sweep back excess glue clinging to the side faces of both feed and applying rollers, as clearly shown in Fig. 6 of the drawings.

The bearings 102 and 103 are bored eccentrically in opposite circular supporting blocks 112, held by retainer rings 113, to set positions and may be adjusted for changing the space 110 between the glue feeding and applying rollers by retracting holding bolts 114 and then rotating said blocks in circular concentric openings 115, in the opposite walls of the glue boxes and subsequently tightening up the bolts 114; thus the density or body of the films of glue delivered to the said box blanks may be varied to compensate for quality and thickness of box blank material and of the quality of the glue employed.

Figure 10:
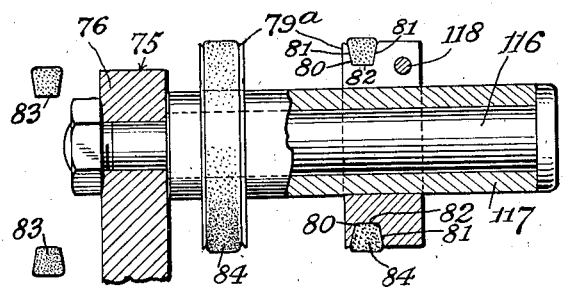
Fig. 10 is an enlarged section taken about on the line 10—10 of Fig. 4, showing the manner of mounting a pair of rear pulleys on a revoluble sleeve common to both and the means employed for adjusting the outer of the pulleys along the sleeve for conveying side box blanks of varied dimensions.
Figure 11:
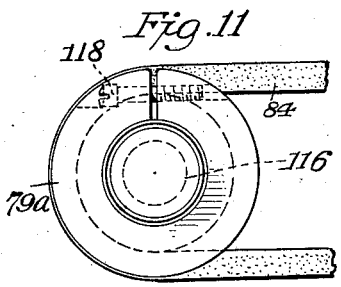
Fig. 11 is a side elevation of said outer pulley and its support.

The adjustability of the outer of each pair of pulleys 79ᵃ at the rear of the presser bearings 75, to correspond with an adjusted position of the outer of each pair of front pulleys 79, is accomplished by providing outwardly directed spindles 116, carrying revoluble sleeves 117, to which both of the side pair of pulleys 79ᵃ are made fast, the inner of each pair being made fast by a driving fit, and the outer pulleys of these pairs by cross or clamping bolts 118 connecting split portions thereof as shown in Figs. 10 and 11. The bolts 118 may be eased up and the outer pulleys moved along the sleeves 117 to a determined point, then the bolts set up again.

A hand wheel 119 is made fast to the cross shaft 55 for turning the parts for inspection and timing when the power driving means is shut off.

The presser housings 75 (Figs. 1, 3 and 4) are provided with side guides 120, in which pressers or presser plates 121 are vertically movable by elongated cams or eccentric portions 122 on the presser shaft 58; these cams carry sleeves 123 within which they rotate and the said sleeves are confined against longitudinal movement between rigid bearings 123ᵃ bolted to the floor of the lower box beam 74.

The sleeves have flat upper surfaces assembled with anti-friction bearings 124, held against the top faces 125 of rectangular openings 126 formed in the pressers 21, by the side legs of yokes 127 secured by bolts 128, (Fig. 1) and in the pressing or sealing operation the rotation of the cams move the sleeves laterally within the yokes under the anti-friction bearings 124, this presser action being similar to that shown and described in the patent above identified except that the pressing movements are upward in this case instead of downward in the patent, for reasons hereinbefore set forth.

The automatic stop mechanism shown, described and claimed in the aforesaid patent is retained in this application for the purpose of presenting a complete machine, and will only be generally described as follows:

Means are provided for preventing the operation of the sealing parts in case no feed is made from any magazine, said means comprising a shouldered lever 129 for each magazine, pivotally mounted on curved arms 130 (Figs. 1 and 2); a forwardly directed feeler or finger 131 is extended from each lever 129 and is curved over and down in front of the top feed roller 45 into the path of movement of the sheets from each magazine; a torsional spring 132, coiled around the pivot of and engaging each lever 129 serves to hold it against the free end of an arm 133 secured to a shaft 134 which is oscillated by an arm 135 connected by a link 136 to an arm 137 pivoted to a gear case 138 as at 139. The arm 137 carries a roller 140 which rides over the cam 135ᵃ on a clutch 144 and a curved link 141 connects said arm 137 with a clutch actuating dog 142, pivoted at 143, on an end of dog controlling handle lever 145. The dog 142 is operated through the above described connections to stop the pressing mechanism when the blanks are exhausted from one or more of the magazines by disconnecting the constantly rotating gear 57, from the presser shaft 58 by releasing a clutch pin 146 (indicated in Figs. 2 and 3) in a manner described in said Patent No. 1,560,162.

In Fig. 1 is shown a roller 147 directly above the pulley shaft 77 for urging the passing side box blanks into intimate contact with the glue applying rollers 96.

The blank supporting faces of the side belts 84 are raised above the corresponding faces of the center belts near the front of the conveyor system, by outwardly projecting rollers or pins 148, (Figs. 1 and 4) and said outer belts are maintained at such elevation by the positions of the rear side pulleys 79ᵃ (see Fig. 1).

Important features of our invention are found in the individual springing mechanism and associated parts which will now be described:—

Mounted in vertical alignment with the pressers 121, are a pair of anvils or anvil plates 149, (Figs. 8, 9, 12 and 13) formed with projecting base flanges 150, end guide extensions 151, spring seats 152, and elongated slots 153, through which movement limiting bolts 154 are passed.

The anvils 149 are slidable between inner plates 155, (Fig. 8) and outer plates 156 (Fig. 5) the latter having semi-circular depression 157, forming half housings for heavy springs 158, the other half of the spring housings being formed by cupped cover plates 159 bolted over openings in the inner plate 155 (Fig. 8).

Operating in guides 160, (Figs. 3 and 5) are drop-bars 161, having cross openings 162, into which the ends of sustaining bars 163, pivoted at 164, project. These bars carry anti-friction rollers 165 in gravitational contact with cams 166, keyed to the cam shaft 44 and having crowns 167 on the peripheries thereof to alternately hold said bars in elevated positions, and to release the same, for gravity movements with their appended drop-bars 161 at properly timed intervals in operative sequential relation with the pressure thrusts.

The drop bars 161 are of novel construction and comprise integral right angularly disposed arms 168 and 169 (Figs. 3 and 5) having preferably bottom longitudinal dovetail retaining grooves 170 and 171 respectively in which adjustable bars 172 and 173 are supported, said bars having downturned center stops 174 and side stops 175 for locating the respective center and side box blanks A and B in proper lateral positions to be assembled.

Box cams 176 having properly formed ogee grooves are fixed to rotate with the cam shaft 44, the grooves being engaged by anti-friction ball rollers 177, swivelled on the tops of upright pins 178, carried on slide blocks 179, movable on guide bars 180, secured in brackets 181, which have guide bearings 182 for loosely engaging the cam shaft 44, journalled in heavy bearings 183 pending from the top wall of the upper box beam 23 (Figs. 2 and 3).

To the inner walls of the anvil housings, as in Fig. 5, are secured threaded nuts 184 which engage the upper adjusting screw 29 so that the housings and the brackets 81, which are fixed each to its housing by a connection 185 (Fig. 3) may be adjusted for widths of the center box blanks, and the box cams 176 having split collars 186 may be adjusted on the cam shaft for widths of the side box blanks.

The slide blocks 179 have downwardly directed pusher fingers 187, for engaging the outer edges of the side blanks to move them inwardly into contact with stop or gage rails 188 (Fig. 9) and under the anvil 149, just before the sealing thrust occurs.

At the start of the upward movement of the presser plate 121, it first raises the center sheet A, from the center belts 83 (Fig. 9) and joggers 189, pivoted on the presser housings are actuated by pins 190 on the moving presser plate to center the sheet A, in proper position, after which said sheet is engaged by the yielding rail 188 and both are carried up for the sealing thrust, after which the presser plates recede and the finished box blank is drawn backwardly in a horizontal plane by the ejector rollers 67 and 68 and disposed upon a suitable table or the like 191, supported on the back of the machine frame.

The chain 30 connecting the various adjusting screws may have any slack taken up by adjusting a gear or roller 192, through a slot 193, in one of the brackets 24 as in Fig. 1. A crank handle 194, Fig. 3, may be employed for operating the chain 30.

Referring to Figs. 8 and 9 a safety means is disclosed for preventing breakage when assembling and starting, or in case of mistiming of the presser and anvil movements and other reasons.

In this construction the stop or gage rail 188, may be provided with two or more vertical slots 195, and bolts 196, are passed through the anvil plate 149, and through said slots, washers and weak springs 197 are placed on the extended bolts back of tightening or retaining nuts 198, thus the bolts are fixed and the rails are movable upwardly and stay up by spring friction, after each rise of the presser plate, until said rails are depressed to the normal position by cams 199 on shaft 44, acting between the sealing operations.

For safety, a pair of bolts 200, extend outwardly through each of the rails 188 and through slots 201, in a trip-plate 202. The bolts 200, have nuts 203 bearing down on heavy springs 204 resting on washers 205 having V ribs 206 entering V grooves 207. If the cam 199 would contact the trip plate while the presser is up, the hard held joint of the rib and groove would slide out before damage of parts occurs.

It is thought that the operation of the machine will be apparent without further description and it is to be understood that the terms and expressions employed are used as terms of description and not of limitation, as mechanical equivalents of the features shown may be employed within the scope of the following claims.

What we claim and desire to secure by Letters Patent is:—

1. In a machine for making paper box blanks, the combination with a frame, of magazines for holding the central and side pieces for making up the box blank structure; means for feeding the pieces from the magazines; rollers for applying lines of adhesive at near the inner under edges of the side pieces when on the general level of the center-piece; belts for conveying all of said side and center pieces forwardly simultaneously; means under the side belts for elevating said side pieces above the center-piece during the forward movement of the pieces; swinging pieces for centering the center-piece at the sealing station; means for moving the inner edges of the side pieces into overlapping positions with the side edges of the center-piece; means for imparting yielding sealing pressure to the overlapped side portions to produce a sealed seam; and means for ejecting the finished blank, thus formed, from the machines.

2. In a machine for making paper box blanks, the combination with parallel spaced supports, of a revoluble shaft having a longitudinal groove and journalled in said supports; inner sleeves, and outer sleeves all keyed to said shaft, longitudinal rows of ratchet teeth formed on the outer faces of the inner sleeves, dogs engaging said ratchet teeth for permitting longitudinal adjustment of the outer sleeves along said shaft, a pulley formed with each of the outer sleeves, inner and outer pulleys arranged at opposite sides of said supports and fast with the inner sleeves, glue applying rollers located between the outer pulleys and said supports, gears on the inner ends of the inner sleeves, rotary means operated by said gear for feeding glue to the glue applying rollers, idler pulleys mounted at the forward ends of said supports and conveying belts traversing said pulleys.

3. In combination, housings; pressers guided therein; a rotary pulley shaft journalled in the housings; a glue applying roller fast on the pulley shaft; a grooved roller operating to feed glue to the applying roller; means for adjusting the space between said rollers; means for operating the presser in said housings; and an anvil against which the presser impinges for sealing together pieces of composite box blanks.

4. In a machine for making paper box blanks, parallel spaced housings; presser plates mounted to slide in said housings; a grooved pulley-shaft journalled in an end of the housings; inner pairs of pulleys and corresponding conveying belts located at the inner side of each housing; outer pairs of pulleys mounted for rotation and in fixed relation with the outer sides of said housings; conveying belts traversing the last named pairs of pulleys; grooved rotary means adjustable for applying determined thicknesses of glue lines to the underside of passing pieces of the said box blanks; side pairs of pulleys and corresponding belts mounted outward of the said outer pairs of pulleys; means for adjusting the side pairs of pulleys with their belts for conveying side box blanks of various widths or dimensions, and means for driving said pulley shaft.

5. In a machine for making paper box blanks, a group of pairs of relatively fixed parallel conveyors and adjustable outer conveyors, said conveyors comprising belts having inwardly flared side walls and flat bottoms and tops, and pulleys having grooves of a cross sectional contour corresponding to that of the belts and rotary glue applying devices fixedly mounted on the hubs of some of said pulleys associated with said conveyors.

6. In a box blank making machine, magazines for holding center and side box blanks; presser plates; yielding anvil plates; conveyor belts operating at either side of each presser plate for conveying box blanks fed from said magazines toward and between the presser and anvil plates; gravity stops for positioning the blanks for the sealing thrust at the sealing station; safety means for preventing rupture of the moving parts in the said sealing thrust; and means for ejecting the progressively finished composite box blanks from the machine.

7. In a box blank making machine having magazines for the box blank pieces; presser plates; spring backed anvil plates; means for applying glue to some of the box blank pieces; belt conveyors for presenting said pieces at the sealing station, means for arranging the blanks in proper relation for sealing between the said plates; means for operating the presser plates for effecting sealed joints between the box blank pieces; and safety means for preventing rupture of parts in the sealing thrust.

8. In a box blank making machine having magazines from which box blank pieces are fed, upper and lower sealing plates normally separated; conveyor belts for transferring the box blank pieces to and between said plates; drop bars; cam controlled means for holding said drop bars in suspension and for releasing the same at timed intervals; said drop bars having right angularly disposed arms; adjustable stops on said arms for limiting the conveying movement of center and side pieces of the box blank to accurately place the pieces to be sealed between the said sealing plates and means for effecting the sealing of said box blank pieces.

9. In a box blank making machine, anvil plates and presser plates arranged in approximate vertical alignment; said anvil plates each comprising a U shaped structure integrally formed with end guide extensions, a foot flange, circular spring seats; enclosed springs resting centrally on said seats and on the set on the median of the plane of said plates to confine sealing thrusts from the presser plates to the said median.

10. In a machine for making paper box blanks, two pair of spaced housings, means for adjusting the space between each pair; anvils slidable in one pair of housings; pressers slidable in the other pair and yielding elements disposed on the medial line of the plane of said anvils and within their housings, to compensate for unequal thrusts of the pressers in a sealing operation and safety means for preventing rupture of the moving parts when the sealing thrusts occur.

11. In a machine for making paper box blanks having magazines from which side and center box blank pieces are advanced; pressers; anvils formed with projecting seats for springs disposed above said pressers and in operative alignment therewith; means for advancing the box blanks to the sealing station with the side pieces above the plane of the center pieces; and springs resting on said seats located in coactive relation with said anvils and centrally of the planes thereof, for compensating unequal sealing thrusts of the pressers for producing uniform sealed joints between the blank pieces.

12. In a machine for making paper box blanks, housings comprising opposite plates; anvil plates slidable between said plates, the inner plate of said housing having openings; the outer or opposite plate having semi-circular depressions for forming halves of spring chambers; semi-circular cap plates bolted over the said openings for forming the other halves of spring chambers; springs in said chambers disposed on the plane lines of the anvil plates and safety means on each anvil housing for preventing rupture of parts when sealing thrusts are initiated against said anvil.

13. In a machine for making paper box blanks, anvils, housings in which they operate; gage bars held for limited vertical movements on said anvils; yielding frictional means for holding the bars where put; a trip plate having slots and V grooves at the sides thereof; bolts extending through said slots from said bars; washers having V ribs disposed in said grooves; nuts on said bolts and heavy springs interposed between the said nuts and washers; and a cam for restoring the gage bars after the anvils receive a sealing impact from a presser member.

14. In a machine for making paper box blanks, in combination, a frame; anvil housings pending from the top of said frame spring held; safety means on said housings; gravity stops suspended on said housings; anvils movable in said housings; and springs located in the planes of said anvils for effecting individual compensation at opposite sides of the sealing mechanism in the sealing thrusts.

15. In a machine for making paper box blanks, presser plates; anvil plates above the presser plates and in vertical alignment therewith, said anvil plates having integral horizontal seats disposed on the medial plane of said plates; springs resting on said seats to eliminate side strains or stresses in the sealing impacts of the presser plates against said anvils and yieldingly interlocked members forming snap-joints to prevent rupture of the moving parts when the timing of the sealing members fails.

CARL EISENLOHR.
BARBARA HREN,
*Executrix of the Estate, Joseph Hren, Deceased.*

CERTIFICATE OF CORRECTION.

Patent No. 2,022,371.                                                               November 26, 1935.

CARL EISENLOHR, ET AL.

It is hereby certified that the name of the second named inventor and his executrix in the signature to the drawings in the above numbered patent were erroneously written and printed as "Joseph Hern" and "Barbara Hern" respectively, whereas said names should have been written and printed as Joseph Hren and Barbara Hren; and that the said Letters Patent should be read with this correction therein that the same may conform to the record of the case in the Patent Office.

Signed and sealed this 14th day of January, A. D. 1936.

Leslie Frazer (Seal)                                    Acting Commissioner of Patents.